(12) United States Patent
Cucchi et al.

(10) Patent No.: US 7,447,199 B2
(45) Date of Patent: Nov. 4, 2008

(54) SWITCHING MATRIX FOR A TELECOMMUNICATION NETWORK ELEMENT

(75) Inventors: Silvio Cucchi, Gaggiano (IT); Paolo Rossi, Magenta (IT); Marisa Treu, Carnia (IT)

(73) Assignee: Alcatel, Paris (FR)

( * ) Notice: Subject to any disclaimer, the term of this patent is extended or adjusted under 35 U.S.C. 154(b) by 629 days.

(21) Appl. No.: 11/081,568

(22) Filed: Mar. 17, 2005

(65) Prior Publication Data

US 2005/0232047 A1 Oct. 20, 2005

(30) Foreign Application Priority Data

Apr. 5, 2004 (EP) .................................. 04290902

(51) Int. Cl.
*H04L 12/50* (2006.01)
(52) U.S. Cl. ........................ 370/386; 370/389; 370/422; 711/104
(58) Field of Classification Search ........................ None
See application file for complete search history.

(56) References Cited

U.S. PATENT DOCUMENTS 5,265,090 A * 11/1993 Guinand et al. ............. 370/377
2002/0181482 A1* 12/2002 Dally et al. .................. 370/412
2005/0062498 A1* 3/2005 New et al. ..................... 326/41

FOREIGN PATENT DOCUMENTS

| EP | 0 913 828 A | 5/1999 |
| EP | 1 011 292 A | 6/2000 |
| EP | 1 073 309 A | 1/2001 |

* cited by examiner

*Primary Examiner*—Duc C Ho
(74) *Attorney, Agent, or Firm*—Sughrue Mion, PLLC

(57) ABSTRACT

Disclosed is a memory-based switching matrix for cross-connecting the content of a plurality of input flows into the content of a plurality of output flows, the input flows being in the form of frames and said content being Time Division Multiplexed or packet data or whatever, the matrix comprising a number of physical memories for memorizing incoming input flows to be output in a predesigned order. The matrix is characterized in that the number of physical memories comprises a first number of memories having a writing role and a second number of memories having a reading role, with the second number being higher than the first number, and in that the role of each memory changes after at least one clock cycle. The arrangement according to the invention saves a number of physical memories with respect to known arrangements.

21 Claims, 3 Drawing Sheets

SWITCHING MATRIX FOR A TELECOMMUNICATION NETWORK ELEMENT

BACKGROUND OF THE INVENTION

1. Field of the Invention

The present invention relates to a switching matrix (also known as switching fabric) for a telecommunication network element, typically an ADM (Add/Drop Multiplexer) or a XDC (Cross-Data-Connect). In particular, the present invention relates to an improved memory based switching matrix for such a network element.

2. Description of the Prior Art

As it is known, an ADM is a network element that provides access to all, or some subsets, of the constituents signals contained within an STM-N. The constituent signals are added to or dropped from the STM-N signal as it passes through the ADM.

Digital cross-connect systems are commonly employed to controllably rearrange and redirect the contents of signals being communicated in digital transmission systems. However, with ever increasing demands for larger transmission capacity, there is a need for increasingly larger capacity non-blocking switch units used in the cross-connect switching fabric. In particular, there is the need to provide a fabric switch whose capacity can be easily varied.

The usual approach is the so-called "bit slice approach" in which the cross-connection is carried out on a number of layered matrices performing, in the most general case, a single bit based switching, namely a single bit-by-single bit cross connection. In such architecture, the incoming payload is distributed to the layered matrices and properly recombined at the output. Usually the data word is conveniently sliced in a fixed number of bits (1, 2, 4). Through such an approach, the switching capacity becomes increased but the provisioning of the matrices is still rather complicated.

The bit slice approach is based on the use of a number of random access memories (RAMs). Indeed, the basic element is a pair of RAMs of the same size. One RAM of the pair of RAMs is designed for storing the incoming data flows whilst the other one is designed for reading the switched output data (stored in the immediately previous step). The task of each of them changes when the RAM storing data is completed.

The ideal architecture is built with a pair of RAMs with as many reading ports as the number of output links. Usually, the maximum number of reading ports of a physical RAM is four. Thus, in order to realize a high capacity matrix switch a number of RAM pairs have to be used.

In the practical basic solution, one pair of RAMs generates one output flow, each RAM having a single reading port. The complete cross-connection of m*i input data flows is obtained using m*i pairs of RAMs. In other words, the basic solution provides for a pair of RAMs for each single outcoming flow, with each of the single RAMs having a single reading port, while all the incoming data are written.

This solution is applicable both for single port reading RAMs and for multi port reading RAMs: the number of output flows equals the number of reading ports. The number of RAM pairs is equal to the total number of the output flows divided by the number of reading ports: to cross-connect m*i flows using RAMs with n reading ports, m*i/n pairs of RAMS are needed. Each output flow is composed of data, which are read from a RAM according to the information address stored in the devoted registers that in turn are written by a microprocessor.

Profitably, this known memory-based arrangement can be used in a scalable (multi chip) architecture. In that case a microprocessor has to configure sequentially each of the chips.

As said above there is an increasing request to have a switching matrix able to manage a large number of backpanel flows, with each backpanel flow carrying a large number of tributaries in frame format. For instance, there could be the need to manage 64 backpanel flows in a TDM (Time Division Multiplexing) configuration, each of them carrying 384 tributaries formed, in turn of two bytes of 8 bits (one word is 16 bits in total).

With the known arrangement, for each incoming flow, the device would have to store 384 words for each tributary in a first RAM. When the step of storing the 384 words of the tributary has finished, further 384 words would be incoming and have to be stored in the RAM associated to the previous one. In the same time, the first RAM would be read and would become available for storing incoming data.

The problem under such a known memory based switch device is that it would request a large amount of memory due to the fact that inside each RAM all the input data are written and that for each output flow there are two RAMs. The required RAM is calculated by multiplying the number of bits for each tributary by the number of tributaries by the number of input links by the number of output links by 2 and divided by the number of reading ports (the multiplication by 2 is need because of there are both working and stand-by RAMs). If, for instance, the number of bits for each tributary is 16, the number of tributaries is 384, the number of input links is 64, the number of output links is 64 as well, and the number of reading ports is one, the required RAM is 50 Mbit (16×384×64×64×2/1). Presently, the maximum RAM which is conveniently implemented on an ASIC device is about 15 Mbit. Therefore, such a RAM would not be conveniently implemented in a single ASIC and thus a switching matrix complying with the above requirement is not available.

In principle, the number of reading ports could be increased by reading the RAMs at a frequency higher than the writing frequency. For instance, if the writing frequency is 155.5 MHz, the reading frequency could be double (311 MHz). In this way, the number of words that can be read in a clock cycle at 155.5 MHz is twice the number of physical ports. This is termed "number of equivalent ports". In any case, even if such a trick would be used, it would not be conveniently implementable; in fact, in that case the required RAM would be 25 Mbit (16×384×64×64×2/2).

A further problem which is connected to the known memory based switch arrangement is the required power, namely energy consumption of the large number of RAMs.

Furthermore, in case of multi chip architecture, a lot of time is needed to provision the whole system because of the sequential configuration through microprocessor. The provisioning through a microprocessor results in a time consuming activity for providing cross connection information. The number of line of software to be written is given by the number of time slots multiplied by the number of output links. Using the above figures, the software lines to be written are 24576 (384×64). The problem becomes even more serious when a multi chip structure is used: in that case, the above number of lines should be multiplied by 4, 8 or more. This time consuming activity renders the matrices hardly scalable.

SUMMARY OF THE INVENTION

In view of the above problems and deficiencies, the main object of the present invention is providing an improved fabric switch overcoming the known problems and disadvantages.

In particular, the main object of the present invention is providing a fabric switch for network elements which employs less memory means than the known arrangements and is implementable for a large number of input/output flows in a scalable manner.

This and further objects are obtained by a memory based switch according to claim 1 and a method according to claim 12. Further advantageous characteristics of the present invention are set forth in the dependent claims. All the claims are deemed to be an integral part of the present description.

According to a first aspect, the present invention provides a memory-based switching matrix for cross-connecting the content of a plurality of input flows into the content of a plurality of output flows, the input flows being in the form of frames, said content being Time Division Multiplexed or packet data or whatever, the matrix comprising a number of physical memories for memorizing incoming input flows to be output in a predesigned order, wherein the number of physical memories comprises a first number of memories having a writing role and a second number of memories having a reading role, with the second number being higher than the first number, and wherein the role of each memory changes after at least one clock cycle.

Preferably, a delay compensator memory is provided for realigning the output flows in the time domain.

Preferably, the physical memories are single-port reading random access memories.

Profitably, the physical memories are multi-port reading random access memories obtained both from a physical multi-port memory or a logical one using higher frequency.

Typically, the matrix according to the invention is implemented by at least one chip.

Furthermore, the arrangement comprises a dedicated provisioning channel for provisioning cross-connection information.

Profitably, the matrix is implemented by a plurality of chips, each chip being configured in parallel by said provisioning channel.

According to one embodiment, the number of input flows is 64 and the number of output flows is 64 as well. In addition, the writing frequency is 155.5 Mb/s and the reading frequency is 311 Mb/s. Profitably, still according to one embodiment, the frames comprise a number of payloads of 384 words, with each word comprising 16 bits. The number of physical memories is forty, arranged in eight groups of five physical memories, each group feeding eight output links, during 384 clock cycles one physical memory of the group having the writing role and the other four memories having the reading role.

According to a second aspect, the present invention provides a method for cross-connecting the content of a plurality of input flows into the content of a plurality of output flows, the input and output flows being in the form of frames, the method comprising the steps of memorizing incoming input flows and reading such memorized flows for outputting them in a predesigned order, wherein the step of memorizing comprises the step of memorizing the flows in a number of physical memories comprising a first number of memories having a writing role and a second number of memories having a reading role, with the second number being higher than the first number, and wherein the role of each memory is changed after at least one clock cycle.

Profitably, the method further comprises the step of delay compensating the cross connected data for realigning the output flows in the time domain.

According to one embodiment, the step of memorizing comprises memorizing data in single-port reading random access memories.

According to a further embodiment, the step of memorizing comprises memorizing data in multi-port reading random access memories.

Preferably, the method further comprises the step of provisioning the cross connection through a dedicated provisioning channel.

According to a preferred embodiment, the number of input flows is 64 and the number of output flows is 64 as well. Still according to a preferred embodiment, the writing frequency is 155.5 Mb/s and the reading frequency is 311 Mb/s. Furthermore, the time division multiplexed frames comprise a number of payloads of 384 words, with each word comprising 16 bits. The number of physical memories is forty, arranged in eight groups of five physical memories, each group feeding eight output links, during 384 clock cycles one physical memory of the group having the writing role and the other four memories having the reading role.

According to a third aspect, the present invention provides a network element comprising at least one memory-based switching matrix as set above, wherein said network element is a Cross Connect, an Add/drop Multiplexer or the like.

The present invention will become clear after reading the following detailed description, given by way of example only and not of limitation, to be read with reference to the accompanying drawings.

BEST MODE FOR CARRYING OUT THE INVENTION

Figure 1:
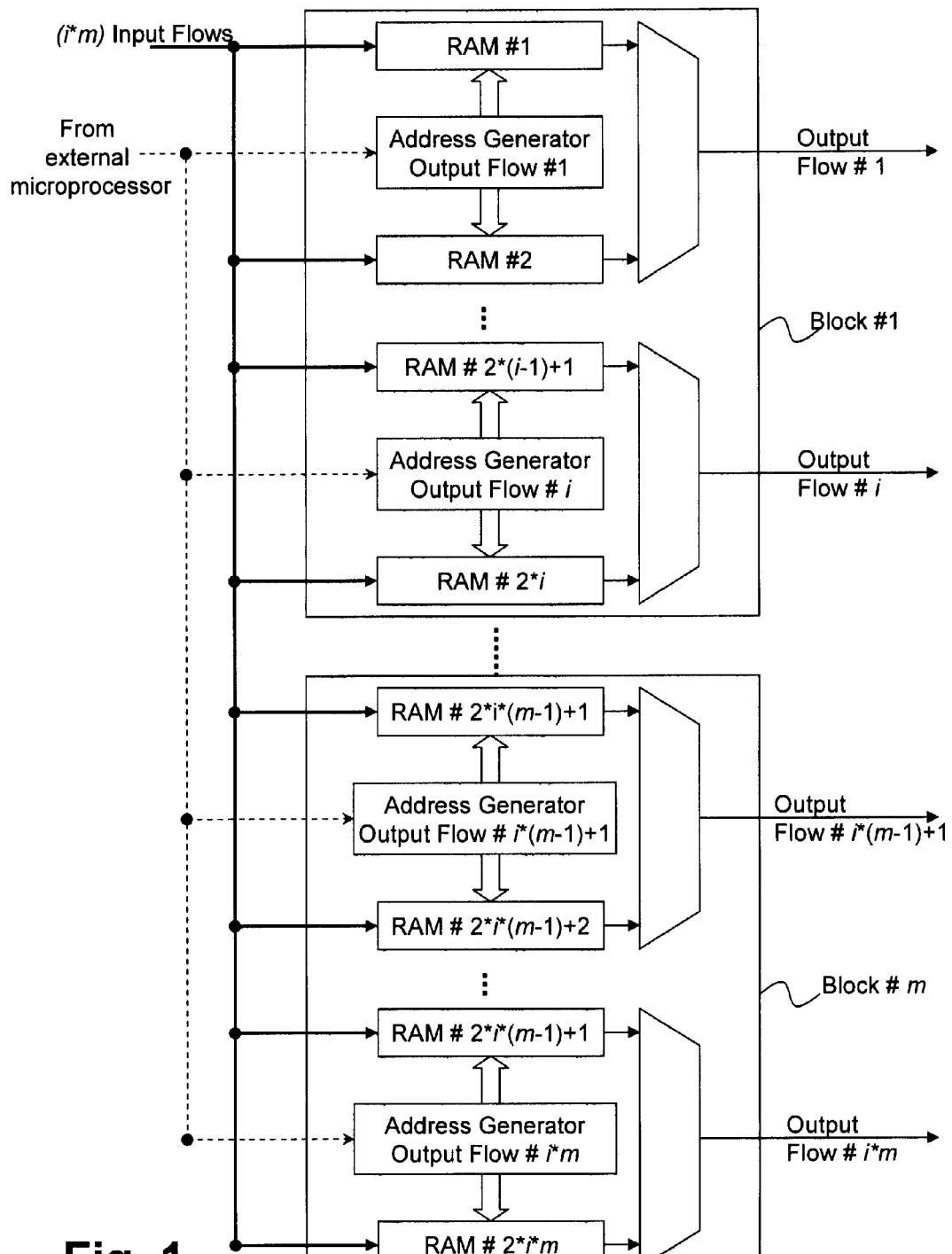
FIG. 1 shows a memory-based switch arrangement fabric matrix according to the prior art.

FIG. 1 shows a memory-based switch arrangement fabric matrix according to the prior art. In such a solution, each pair of RAMs, for instance RAM#1 and RAM#2, generate one output flow, for instance Output Flow #1. The complete cross-connection of m*i input data flows is obtained using m*i pairs of RAMs. In other words, the basic solution provides for a pair of RAMs for each single outcoming flow, with each of the single RAMs having a single reading port. While the arrangement of FIG. 1 represents a single chip arrangement, the architecture can be used in a scalable (multi chip) architecture.

For the purposes of clarity, in addition to a general description (made by using letters instead of numbers) of the prior art and of the present invention, a specific implementation will be described in detail, the specific implementation representing the best mode for carrying out the invention.

Figure 2:
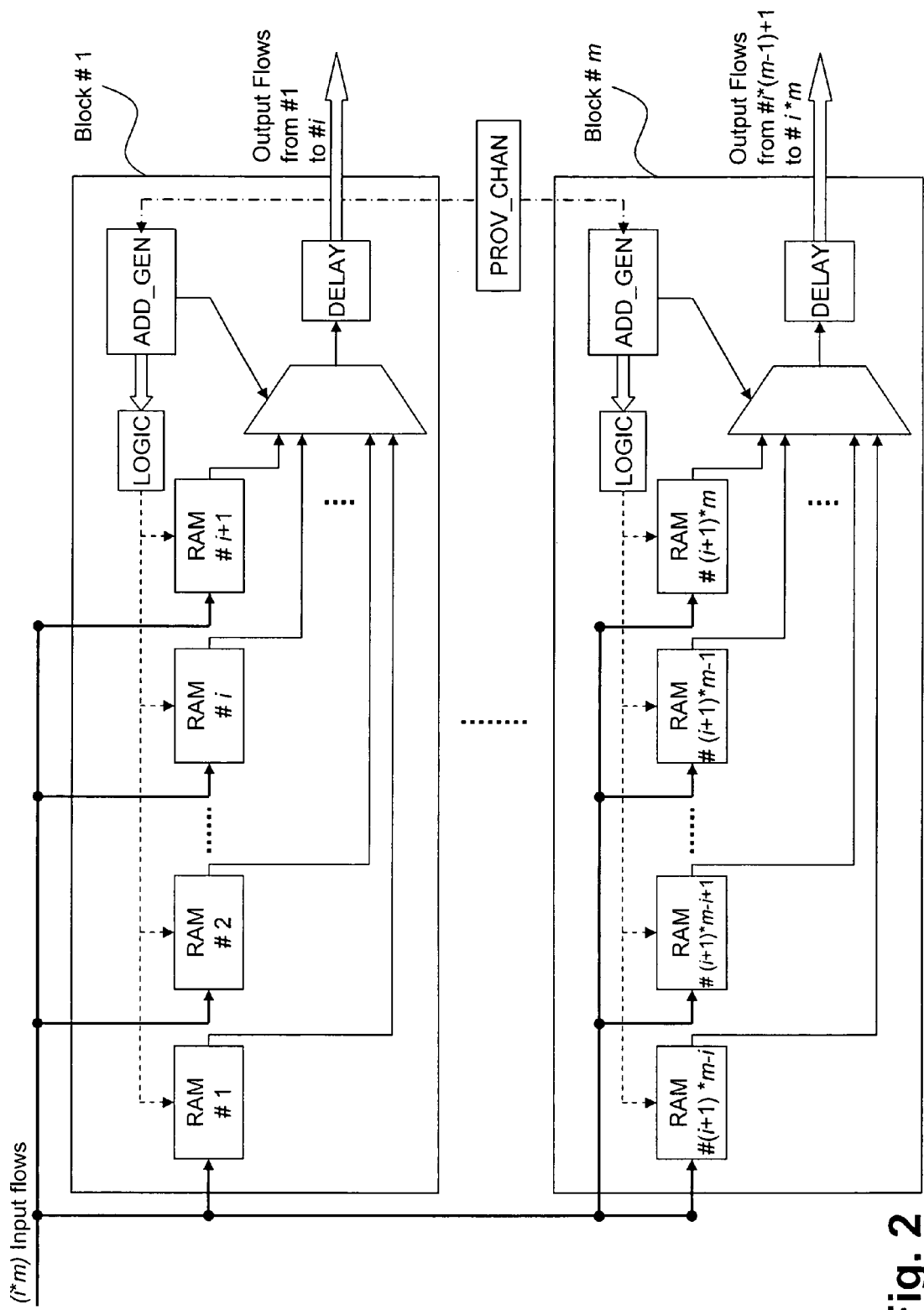
FIG. 2 shows a memory-based switch arrangement fabric matrix according to the present invention where each BLOCK is mapped in a different structure where it is possible to see the reduced number of RAM requirement.

In FIG. 2 a memory-based switch arrangement according to the present invention is shown. Each block (Block #1, ... Block #m) of FIG. 1 that supplies i flows is rearranged as represented in FIG. 2. The single RAM size is the same as in FIG. 1. The total number of RAMs used with this arrangement is m*(i+1), thus saving m*(i−1) RAMs with respect to the prior art.

According to the present invention, only one data RAM for each block is used for storing input data flows (namely, only one data RAM is written) while the others i data RAMs are read to produce i output flows: each data RAM feeds a single data flow. The data stored in reading data RAMs from #1 to #i were stored during previous i time slots, with time slot duration corresponding to the amount of data to be switched (equal to the DATA RAM size).

When the RAM which is storing data becomes full, the reading RAM with oldest data becomes empty and the role of the RAMs is shifted: the empty RAM starts storing input flows and the RAM just filled up begins to output flow #1, the RAM that was feeding flow #1 starts to output flow #2 and so on till the RAM that was supplying flow #(i−1) begins to output flow #i. In this way, the output flows that are read from each of the RAMs are delayed one with respect to the other. Profitably, a delay compensator memory DELAY realigns the output flows.

This solution is applicable both for single and multi port reading RAMs: the number of output flows of each RAM equals the number of reading ports.

Each output flow is built with data read from RAM according to the information address written through a dedicated provisioning channel (PROV_CHAN) into an address generator ADD_GEN. On the contrary, in the solution of FIG. 1, the configuration written by an external source (microprocessor) was directly used to address the RAMs. According to the present invention, the configuration must be managed by a rather small combinational logic means (LOGIC) in order to generate the proper RAM address.

With reference to a specific implementation of the present invention, the switch arrangement of FIG. 2 can be part of a time division matrix providing a complete cross-connection matrix between 64 input backpanel frames and a corresponding number of backpanel frames, all entering (or exiting from) the matrix at a bit rate of 155.5 Mb/s in a 2.488 Gb/s backpanel format. Frames can be composed of a combination of either AU4s or AU3s.

The RAM structure is applicable for other TDM components (VC11, VC12, etc.) switching and data switching so it is suitable to built fabric switching for packet data.

The switch according to the present invention is not designed for handling tributaries (AUs) but single words. In fact, a backpanel frame is composed by words of a number of bits (16 bits in the present implementation). In other words, each tributary is seen as a sequence of words. In order to provide a certain cross-connection, a configuration for all the words the tributary is formed of should be specified.

Figure 3:
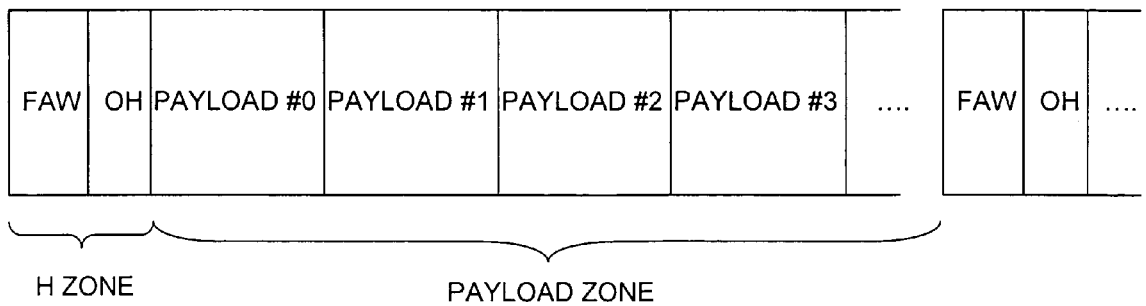
FIG. 3 shows an exemplifying backpanel frame structure.

A backpanel 2.488 Gb/s format frame which could be used in connection with the present invention is shown in FIG. 3. The frame comprises a header portion, H ZONE, and a payload portion, PAYLOAD ZONE. The H ZONE is 240 words long. The PAYLOAD ZONE comprises a number of payloads (PAYLOAD #1, PAYLOAD #2, . . . ) of 384 payload words, regardless of bit slice used. According to the invention, only payload words are cross-connected while FAW (frame alignment words) and overhead (OH) are discarded.

Figure 4:
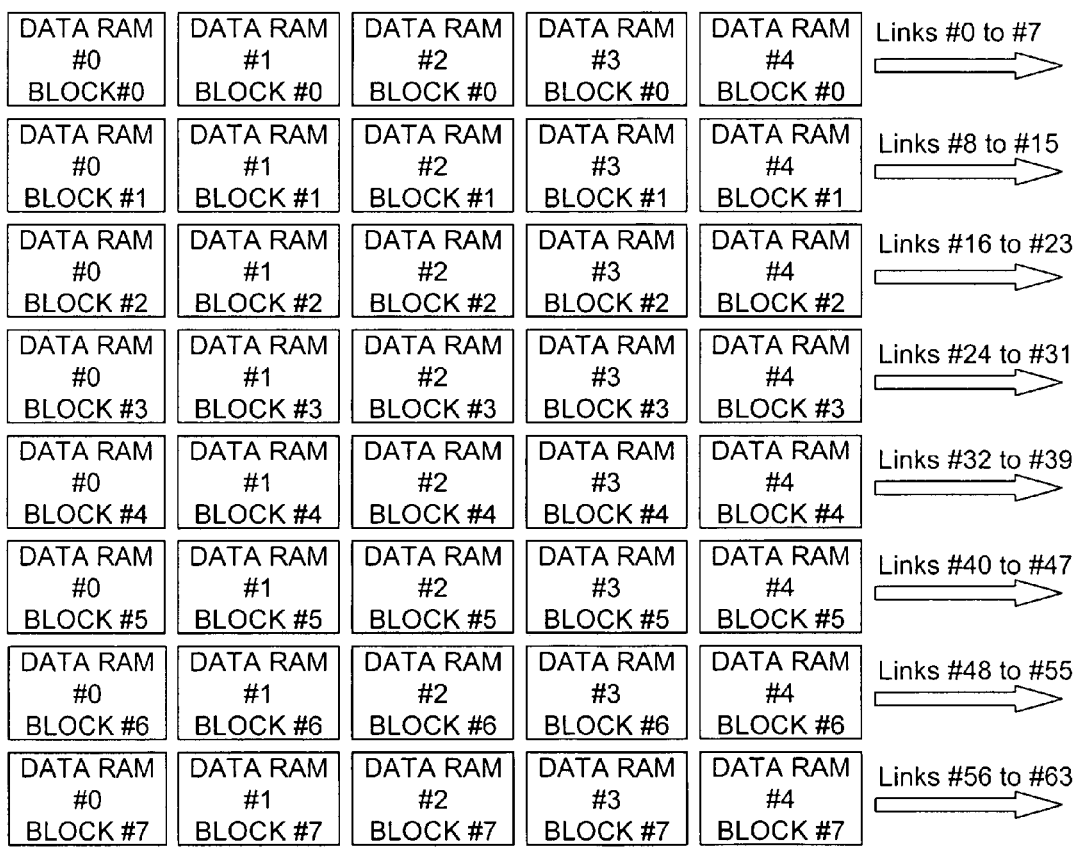
FIG. 4 shows, in a schematic representation, a data RAM arrangement according to an embodiment of the present invention.

According to the present invention, the whole data RAM can be seen as a number (#RAM) of physical RAMs that is given by the following formula: #RAM=(t/n)+r where t is the total number of links, n is the number of equivalent reading ports of each physical RAM and r is the number of BLOCKs forming the whole logical RAM. In the case in question, the number of links is 64. In order to provide a more efficient matrix, each physical RAM is designed with two equivalent reading ports. Furthermore, r is set to 8. Therefore, it follows that the number of physical RAMs is 40. The arrangement of physical data RAMs in a preferred embodiment of the present invention is shown in FIG. 4. For the present example, the formulas previously explained related to power saving and memory area saving can be computed using m=8 and i=8.

The physical characteristics, given by way of example and not of limitation, of the RAMs used in connection with the present invention are the following:

working frequency: 311 MHz (write at 155.5 MHz, read at 311 MHz)

size: 1024×384 bits 1 writing port 2 equivalent 16 bit reading ports

As shown in FIG. 4, the BLOCKs of DATA RAMs have been designed by BLOCK#0 to BLOCK#7 and the DATA RAMs of each block have been indicated as DATA RAM #0, DATA RAM #1, . . . , DATA RAM #4. Each block of DATA RAMs generates 8 of the 64 output links that come out from the matrix according to the invention. For example, the first block of DATA RAMs generates output links #0 to #7. Two links are read from each DATA RAM because each DATA RAM has two equivalent reading ports. Each block includes 5 DATA RAMs. During a clock cycle, one is written while the other four are read. The role of the five DATA RAMs changes cyclically after 384 payload words.

As said above, the H ZONE of the backpanel frame is not stored in data RAMs. Therefore, after H ZONE, the next 384 words of payloads are written in each DATA RAM #0 while all the other 32 DATA RAMS are read.

When all the DATA RAMs #0 are full, the incoming data flow is written in DATA RAMs #1 and so on with DATA RAMs #2, DATA RAMs #3 and DATA RAMs #4. Then, DATA RAMs #0 are written. When a physical DATA RAM is written, it is not read and vice-versa. During H ZONE all the DATA RAMs are switched off.

The following table 1 depicts the role of the five DATA RAMs arranged on a single block of RAMs during the time. Clearly, the situation is identical in each block of RAMs and cyclically repeats on the sequence of five RAMs.

TABLE 1

| Frame zone (# clock cycles at 155.5 MHz) | DATA RAM #0 | DATA RAM #1 | DATA RAM #2 | DATA RAM #3 | DATA RAM #4 |
|---|---|---|---|---|---|
| H ZONE (240) | Turned off | Read | Read | Read | Read |
| PAYLOAD #0 (384) | Write (t0) | Read (144) Turned off (240) | Read | Read | Read |
| PAYLOAD #1 (384) | Read (t0; #0, #1) | Write (t1) | Read (144) Turned off (240) | Read | Read |
| PAYLOAD #2 (384) | Read (t0; #2, #3) | Read (t1; #0, #1) | Write (t2) | Read (144) Turned off (240) | Read |
| PAYLOAD #3 (384) | Read (t0; #4, #5) | Read (t1; #2, #3) | Read (t2; #0, #1) | Write (t3) | Read (144) Turned off (240) |
| PAYLOAD #4 (384) | Read (t0; #6, #7) | Read (t1; #4, #5) | Read (t2; #2, #3) | Read (t3; #0, #1) | Write (t4) |
| PAYLOAD #5 (384) | Write (t5) | Read (ti; #6, #7) | Read (t2; #4, #5) | Read (t3; #2, #3) | Read (t4; #0, #1) |
| PAYLOAD #6 (384) | Read (t5; #0, #1) | Write (t6) | Read (t2; #6, #7) | Read (t3; #4, #5) | Read (t4; #2, #3) |
| PAYLOAD #7 (384) | Read (t5; #2, #3) | Read (t6; #0, #1) | Write (t7) | Read (t3; #6, #7) | Read (t4; #4, #5) |

It is clear from the above table, as said before, that only one of the five DATA RAMs is in the writing stage while the other four are in the reading stage. When H ZONE is received (see the first line of the table), it is not stored in the RAM. Thus, DATA RAM #0 is kept turned off while DATA RAMs #1, #2, #3 and #4 are in the reading state (previously stored data are read). The reading frequency is 311 MHz (twice the writing frequency).

With reference to line 2 of Table 1, at time t0, DATA RAM #0 is set in the writing state. Time t0 is deemed to be the reference time. It means that at that time, the first 384×64 payload words (PAYLOAD #0) are written. Analogously, at times t1, t2, t3, ... PAYLOAD #1, PAYLOAD #2, PAYLOAD #3, ..., respectively, will be written. At time t0, DATA RAM #1 is turned off for 240 clock cycles and is read for the remaining 144 (namely, 384-240) clock cycles. The other DATA RAMs #2, #3, #4 are read.

At time t1 (see line 3 of Table 1), PAYLOAD #1 is written in DATA RAM #1. At the same time, DATA RAM #0 is read. DATA RAM #0 contains a payload which was written in the data RAM at time t0. As indicated in the relevant cell of the table, the output links that are read from DATA RAM #0 are output links #0 and #1. At the same time t1, DATA RAM #2 is turned off for 240 clock cycles and is read for the remaining 144 (namely, 384-240) clock cycles. The other DATA RAMs #3 and #4 are read.

At time t2 (see line 4 of Table 1), PAYLOAD #2 is written in DATA RAM #2. At the same time, DATA RAMs #0 and #1 are read. DATA RAM #0 contains a payload which was written in it at time t0. As indicated in the relevant cell of the table, the output links that are read from DATA RAM #0 are output links #2 and #3. DATA RAM #1 contains a payload which was written in it at time t1. As indicated in the relevant cell of the table, the output links that are read from DATA RAM #1 are output links #0 and #1. At the same time t2, DATA RAM #3 is turned off for 240 clock cycles and is read for the remaining 144 (namely, 384-240) clock cycles. The remaining DATA RAM #4 is read.

At time t3 (see line 5 of Table 1), PAYLOAD #3 is written in DATA RAM #3. At the same time, DATA RAMs #0 to #2 are read. DATA RAM #0 contains a payload which was written in the data RAM at time t0. As indicated in the relevant cell of the table, the output links that are read from DATA RAM #0 are output links #4 and #5. DATA RAM #1 contains a payload which was written in the data RAM at time t1. The output links that are read from DATA RAM #1 are output links #2 and #3. DATA RAM #2 contains a payload which was written in the data RAM at time t2. The output links that are read from DATA RAM #2 are output links #0 and #1. At the same time t3, DATA RAM #4 is turned off for 240 clock cycles and is read for the remaining 144 (namely, 384-240) clock cycles.

At time t4 (see line 6 of Table 1), PAYLOAD #4 is written in DATA RAM #4. At the same time, DATA RAMs #0 to #3 are read. DATA RAM #0 contains a payload which was written in the data RAM at time t0. As indicated in the relevant cell of the table, the output links that are read from DATA RAM #0 are output links #6 and #7. DATA RAM #1 contains a payload which was written in the data RAM at time t1. The output links that are read from DATA RAM #1 are output links #4 and #5. DATA RAM #2 contains a payload which was written in the data RAM at time t2. The output links that are read from DATA RAM #2 are output links #2 and #3. DATA RAM #3 contains a payload which was written in the data RAM at time t3. The output links that are read from DATA RAM #3 are output links #0 and #1.

At time t5 (see line 7 of Table 1), DATA RAM #0 is set again in the writing state. In fact, PAYLOAD #5 is written in it. The other DATA RAMs are in the reading state. In particular, from DATA RAM #1 a payload written at time t1 is read for feeding output links #6 and #7. From DATA RAM #2 a payload written at time t2 is read for feeding output links #4 and #5. From DATA RAM #3 a payload written at time t3 is read for feeding output links #2 and #3. Finally, from DATA RAM #4 a payload written at time t4 is read for feeding output links #0 and #1.

The meaning of the indications written in the cells of lines 8 and 9 of Table 1 will be now clear. In any case, four of the five data RAMs are read while one is written. The role/task of the data RAMs changes cyclically after 384 payload words. The BLOCK #0 feeds the eight output links #0 to #7. As the fabric switch device according to the invention comprises 8 BLOCKs, up to 64 output links can be served.

It will be realized that eight out flows with the same reference time are read from the various DATA RAMs at different time slots: output links #0 and #1 are read at time t1; output links #2 and #3 are read at time t2, namely after 384 clock cycles; output links #4 and #5 are read at time t3, after 768 clock cycles; output links #6 and #7 are read after 1152 clock cycles. It follows that, in order to realign the flows, that are read before output flows #6 and #7, flows #0 to #5 should be properly delayed. Output links #0 and #1 must be delayed of 1152 clock cycles, output links #2 and #3 must be delayed of 768 clock cycles and output links #4 and #5 must be delayed of 384 clock cycles. For the above reason, a delay RAM (indicated by "DELAY" in FIG. 1) should be provided.

Indeed, the delay RAM comprises, for each block of physical RAMs, three physical delay RAMs. Thus, there are twenty-four physical delay RAMs in total. In the example given above in detail, the three physical delay RAMs have respective sizes of $(384 \times W \times 2)$ bits, $(768 \times W \times 2)$ bits and $(1152 \times W \times 2)$ bits, where W is the length of the word, namely 16 bits. The working frequency is 155.5 MHz. In the described embodiment, each physical delay RAM is provided with a single reading port and a single writing port. It should be realized that the size of such delay memories is negligible with respect to the other DATA RAMs.

As said above and shown in FIG. 2, a dedicated provisional channel PROV_CHAN is provided in the matrix arrangement according to the present invention for provisioning the matrix in a profitable and convenient manner. In a multi chip configuration, the provisioning information are transferred from one chip to the others in a cascade manner. Therefore, only one chip is software configured. This results in a highly scalable matrix and rather easy to be designed.

According to the invention, a combinational logic block, indicated by LOGIC, cooperating with an address generator ADD_GEN is provided. In turn, ADD_GEN cooperates with a MUX before the delay storage. According to the invention, for each word of each output link, ADD_GEN indicates which input word must be connected to. Profitably, ADD_GEN contains 24576 registers (namely, 384 words ×64 links). Each register is related to an output word and is made of two fields: 6 bits indicate the input link and the other 9 indicate the related input word. In the same way, every register can be externally addressed using 15 bits: 6 bits select the output link and the other 9 select the related output word.

It is now clear that, with respect to the solutions according to the prior art, the proposed one saves $m*(i-1)$ RAMs and permits also to reduce power consumption: if Pr and Pw are power dissipation for read and write cycles, respectively, of a single RAM, the total power dissipation of the arrangement in FIG. 1 is $m*i*(Pr+Pw)$, while the power dissipation for the embodiment according to the present invention is $m*i*Pr+ m*Pw$, therefore saving $m*(i-1)*Pw$.

Furthermore, the introduction of a fast dedicated Provisioning Channel allows a quicker configuration refresh of the RAM Address Generator than the usual Microprocessor Channel.

There have thus been shown and described a novel fabric matrix and a novel method which fulfil all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the scope of the invention are deemed to be covered by the invention which is limited only by the claims which follow.

It should be remarked again that the detailed description of the preferred embodiment given above is not to be deemed as limiting and different configurations could be used. For instance, the number of input/output flows can vary, as well as the number of bits for each word and each tributary. Also the frame arrangement can depart from the one shown in FIG. 3.

Furthermore, the reading and writing frequencies, the number of RAMs and the number of BLOCKs can be different from the ones of the preferred embodiment. In a still profitable embodiment, each data RAM has one single input port and one single output port (and not two equivalent output ports as in the described embodiment). In a more profitable embodiment, each DATA RAM has more than two equivalent output ports, for instance four output ports. In this way, the number of required RAM could decrease.

We claim:

1. A memory-based switching matrix for cross-connecting a content of a plurality of input flows into a content of a plurality of output flows, said input flows being in the form of frames, said matrix comprising a plurality of physical memories for memorizing incoming input flows to be output in a predesigned order, wherein the plurality of physical memories comprises at least one first physical memory having a writing role and at least one second physical memory having a reading role, wherein a greater number of the physical memories have the reading role than the writing role during a clock cycle, and wherein the role of each of the plurality of physical memories changes after at least one clock cycle.

2. The matrix according to claim 1, wherein a delay compensator memory is provided for realigning said output flows in the time domain.

3. The matrix according to claim 1, wherein the plurality of physical memories are single-port reading random access memories.

4. The matrix according to claim 1, wherein the plurality of physical memories are multi-port reading random access memories.

5. The matrix according to claim 1, wherein the matrix is implemented by at least one chip.

6. The matrix according to claim 1, wherein the matrix comprises a dedicated provisioning channel for provisioning cross-connection information.

7. The matrix according to claim 6, wherein the matrix is implemented by a plurality of chips, each chip being configured in parallel by said provisioning channel.

8. The matrix according to claim 1, wherein a number of input flows is 64 and a number of output flows is 64.

9. The matrix according to claim 8, wherein the matrix operates at a writing frequency of 155.5 Mb/s and at a reading frequency of 311 Mb/s.

10. The matrix according to claim 8, wherein said frames comprise a number of payloads of 384 words, with each word comprising 16 bits.

11. The matrix according to claim 8, wherein the plurality of physical memories comprises forty physical memories, arranged in eight groups of five physical memories, each group feeding eight output links, and during 384 clock cycles, one physical memory of each group has the writing role and the other four memories have the reading role.

12. A network element comprising at least one memory-based switching matrix according to claim 1, wherein said network element is a Cross Connect or an Add/drop Multiplexer.

13. A method for cross-connecting a content of a plurality of input flows into a content of a plurality of output flows, the input and output flows being in the form of frames, the method comprising:
  memorizing incoming input flows and reading such memorized flows for outputting the memorized flows in a predesigned order,
  wherein the memorizing comprises:
    memorizing the flows in a plurality of physical memories comprising at least one first physical memory having a writing role and at least one second physical memory having a reading role,
    wherein a greater number of the physical memories have the reading role than have the writing role during a clock cycle, and
  changing the role of each of the plurality of physical memories after at least one clock cycle.

14. The method according to claim 13, further comprising delay compensating the cross connected data for realigning the output flows.

15. The method according to claim 13, wherein the memorizing comprises memorizing data in a plurality of single-port reading random access memories.

16. The method according to claim 13, wherein the memorizing comprises memorizing data in a plurality of multi-port reading random access memories.

17. The method according to claim 13, further comprising provisioning the cross connection through a dedicated provisioning channel.

18. The method according to claim 13, wherein a number of input flows is 64 and a number of output flows is 64.

19. The method according to claim 13, wherein the writing frequency is 155.5 Mb/s and the reading frequency is 311 Mb/s.

20. The method according to claim 13, wherein the time division multiplexed frames comprise a number of payloads of 384 words, with each word comprising 16 bits.

21. The method according to claim 13, wherein the plurality of physical memories comprises forty physical memories, arranged in eight groups of five physical memories, each group feeding eight output links, and during 384 clock cycles, one physical memory of each group has the writing role and the other four physical memories of each group have the reading role.

* * * * *